United States Patent [19]

Buckley

[11] Patent Number: 4,992,086
[45] Date of Patent: Feb. 12, 1991

[54] MULTIFOCAL LENS METHOD

[75] Inventor: Milford L. Buckley, Horseheads, N.Y.

[73] Assignee: Corning Incorporated, Corning, N.Y.

[21] Appl. No.: 481,209

[22] Filed: Feb. 20, 1990

[51] Int. Cl.$^5$ .............................................. C03B 11/08
[52] U.S. Cl. ............................................ 65/38; 65/61
[58] Field of Search ......................... 65/37, 38, 39, 61

[56] References Cited

U.S. PATENT DOCUMENTS

| 901,576 | 10/1908 | Wilhelm | 65/39 |
| 2,936,674 | 5/1960 | Beasley | 65/38 |
| 4,842,632 | 6/1989 | Buckley | 65/38 |

FOREIGN PATENT DOCUMENTS 681166 3/1964 Canada .................................. 65/37

Primary Examiner—Robert L. Lindsay
Attorney, Agent, or Firm—Milton M. Peterson; Clinton S. Janes

[57] ABSTRACT

There is disclosed a method of producing a multifocal, ophthalmic lens blank wherein a glass major element is formed that has a raised countersink zone on one surface, the remainder of the glass major element being thinner than the countersink zone, but of such thickness that it can be ground and polished to form a lens, a countersink is formed in the countersink zone, a segment element is formed and is fused in the countersink to form a lens blank assembly.

10 Claims, 1 Drawing Sheet

MULTIFOCAL LENS METHOD

The field of this invention is multifocal lens blanks and lenses, and the producing of such articles.

INTRODUCTION

The present invention essentially modifies conventional, multifocal, lens-making practice. The modification minimizes the amount of glass that must be removed in converting a lens blank into a finished lens.

My U.S. Pat. No. 4,842,632 describes in detail the conventional practice followed in producing glass, multifocal lens blanks and lenses. Accordingly, the teachings of that patent, in their entirety, are incorporated by reference.

In conventional, lens-making practice, a major element is formed from a type of glass commonly known as a crown glass. This major element has a cavity, referred to as a countersink, ground and polished in its upper or front surface. The cavity is usually concave, but may be either plano or convex if the nature of the correction requires. The major element provides for far vision correction in a finished lens.

A second lens element, known as a segment, is formed separately. The segment is formed from a glass commonly referred to as a flint, or barium flint, glass. This glass is normally softer, that is, softens at a lower temperature than the crown glass from which the major is formed. It also has a different refractive index, whereby it provides near vision correction. The segment frequently is sealed to a piece of crown glass which serves as a carrier.

One surface of the segment is ground and polished to a curvature that is the reverse of the countersink curvature. The segment is then mounted in the countersink with its finished surface facing the countersink surface of the major. Normally, the lower end of the segment rests against the major, and the upper, or carrier, end rests on spacers. A key feature of my --632 patent is provision of glass spacer elements.

The assembly is then heated to fusion temperature to unite the segment with the major. This fused combination is a lens blank which, when ground and polished to a predetermined curvature, provides a lens having the desired corrections.

PURPOSES OF THE INVENTION

In conventional practice, a substantial portion of a fused, multifocal lens blank has to be ground away to produce the final lens. This represents a double economic loss. There is, of course, the initial glass cost. Then, the grinding process consumes both time and significant material to finish the front convex face to the desired segment add size.

It is then a basic purpose of the present invention to provide a less expensive method of producing a fused, multifocal, ophthalmic lens.

Another purpose is to provide a method of producing a fused, multifocal, ophthalmic lens in which a much smaller amount of glass must be removed from the blank, particularly from the major element.

A further purpose is to provide a method of producing a fused, multifocal, ophthalmic, lens blank moulding embodying a substantially thinner major element than heretofore used.

PRIOR ART

In addition to Applicant's United States patent mentioned above, and the reference patents noted therein, attention is also directed to the following U.S. patents:

U.S. Pat. No. 901,576 (Wilhelm) discloses forming a molded glass blank having integral projections which surround a cavity and which support a disk to be thermally sagged into the cavity and united with the blank. It provides no suggestion of molding a thinner major blank.

U.S. Pat. Nos. 1,157,411 (Morine) and 1,282,877 (Laabs) disclose sealing positioning means on a major blank to maintain a segment in proper location during fusion. Neither patent has any suggestion of employing a thinner major blank.

SUMMARY OF THE INVENTION

One aspect of the invention is a method of producing a multifocal, ophthalmic, lens blank assembly which comprises forming a glass major element, the major element having a thickness only slightly greater than the predetermined thickness of the final lens, except for a raised zone in which a countersink is to be formed, the raised zone having a substantially greater thickness, largely removing the raised portion of the major to form a countersink that extends below the line of finished lens curvature defined by the upper surface of the remainder of the major element, forming a segment element, placing the segment element in the countersink on the major and subjecting the assembly to a fusing temperature to provide a fused, multifocal, ophthalmic lens blank. The lens blank may then be ground and polished on its convex surface to a predetermined surface curvature to produce a finished lens having the reading segment of the final size desired.

Preferably, the overall thickness of the raised countersink zone of the major approximates the conventional major element thickness. It is also desirable, in forming a countersink, to retain a peripheral shoulder. The shoulder may be at least one-fifth, but not more than one-third, the average thickness of the remainder of the major element. Optionally, the segment element is sealed to a crown glass carrier member.

BRIEF DESCRIPTION OF THE DRAWINGS

In the accompanying drawings.

DESCRIPTION OF THE INVENTION

Figure 1:
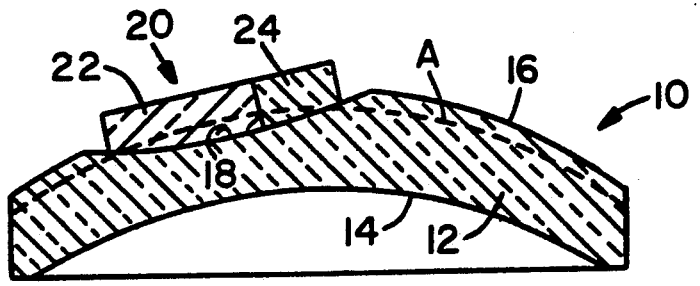
FIG. 1 is a cross-sectional view of a prior art, ophthalmic, multifocal, lens blank assembly.

FIG. 1 shows a lens blank assembly, generally designated 10, as employed heretofore in producing a multifocal, ophthalmic lens in glass. Assembly 10 comprises a major element 12 having a concave curvature on its underside 14, and a corresponding convex curvature on its upper side 16. Upper side 16 has a countersink 18 formed in its surface by grinding and polishing.

In a separate operation, a segment member 20 is formed by sealing a barium flint glass segment 22 to a crown glass carrier 24. Composite segment member 20, thus formed, has one surface ground and polished to a convex curvature that matches the concave curvature of countersink 18.

Composite segment 20 is then positioned in countersink 18, as shown in FIG. 1. The assembly 10 is heated to fusing temperature, typically in the range of 650°-750° C., depending on the particular glasses chosen. In general, photochromic glass majors employ fusion temperatures 50°-75° C. below those of white crown glass majors.

Figure 2:
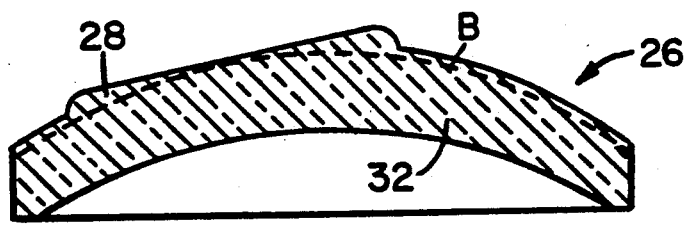
FIG. 2 is a cross-sectional view of a molded major element in accordance with the present invention.

A key feature of the present invention is utilization of a molded, major element blank 26 of unique shape. This unique major blank, as shown in FIG. 2, is much thinner than normal, except for a raised portion here referred to as countersink zone 28. Countersink zone 28 is that portion of the major which is largely removed by grinding and polishing to form a countersink, as shown by numeral 30 in FIG. 3.

In forming countersink 30, a raised shoulder or bead 34 of suitable diametrical size is retained around the periphery of the countersink. This accommodates confinement of the seal during fusion of the oversize segment assembly, or round barium flint button segment (as used in barium round multifocal lenses). In accordance with conventional multifocal fusing practice, these segments are necessarily oversize, that is, larger than the final finished reading segment. Peripheral shoulder or bead 34 also serves to strengthen the periphery of the countersink. This enables it to accommodate mechanical grinding and polishing by conventional mass production techniques to set a smooth blend of surfaces without chippage or marring of the polished surface when forming a countersink.

The remainder of major element 26, identified by numeral 32, is of such thickness that countersink 30 can be formed, and the upper surface can be ground and polished, in forming a final lens. Normally, the overall thickness of blank 26 in countersink zone 28 approximates the normal, uniform thickness of prior, molded, major element blanks. The remaining portion 32 will be substantially thinner, but, preferably, at least three times the peripheral shoulder thickness of zone 28.

Figure 4:
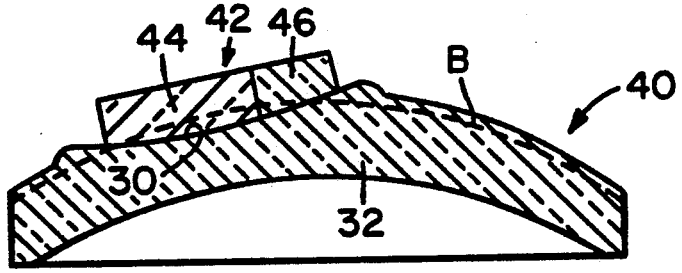
FIG. 4 is a cross-sectional view of an ophthalmic, multifocal, lens blank assembly in accordance with the invention.

FIG. 4 shows a lens blank assembly 40 in accordance with the invention. In assembly 40, composite segment member 42 is essentially identical to prior segment 20 of FIG. 1. Segment 42 is mounted in countersink 30 preparatory to fusion. Segment 42, like segment 20, is composed of a barium flint segment 44 sealed to a crown glass portion 46. The latter is compatible with, and preferably identical to, the crown glass of major 32.

It will be appreciated that the present invention employs conventional glasses for both the major and the segment members. These glasses will, of course, be selected in conventional manner to provide a predetermined combination of refractive indices necessary for desired visual correction in an ultimate lens. Neither the glasses chosen, nor the combinations employed, are part of the invention. Further details are considered unnecessary, since the glasses are well known and widely used in the art. However, the invention is of particular interest in connection with photochromic glasses, because of the greater difficulty and cost of producing such glasses.

Figure 5:
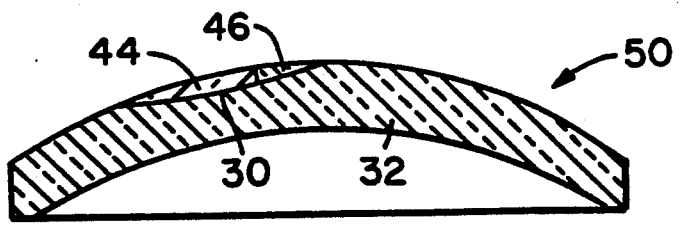
FIG. 5 is a cross-sectional view of the assembly of FIG. 4 after being finished as a lens.

When the assembly 40 of FIG. 4 is fused in the conventional fusing step, the resulting blank is ready for finishing. This is done by grinding and polishing to remove the bulk of segment 42, plus a thin layer from the upper surface of major 32. The finish line is shown by dotted line B in FIG. 4. The finished lens 50, thus produced, is shown in FIG. 5.

Figure 3:
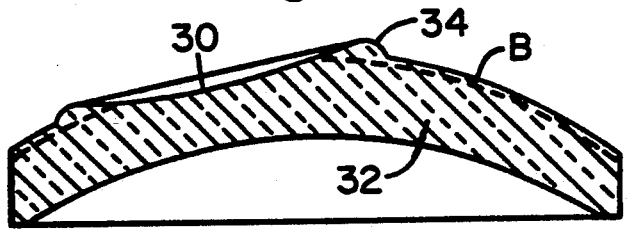
FIG. 3 is a cross-sectional view of the major element of FIG. 2 after a countersink is formed therein.

Dotted line A in FIG. 1, and dotted line B in FIGS. 2, 3 and 4, represent the final finish line in the resulting lens in each case.

It is readily apparent, particularly from a comparison of FIGS. 1 and 4, that the present invention provides a substantial saving in glass lost by grinding and polishing, as well as time and cost involved in the grinding and polishing step.

I claim:

1. A method of producing a miltifocal, ophthalmic, lens blank assembly which comprises forming a glass major element, the glass major element having a raised countersink zone on one surface, the remainder of the glass major element being thinner than the countersink zone, but of such thickness that it can be ground and polished to form a lens, largely removing the raised portion of the major to form a countersink that extends below the line of finished lens curvature defined by the upper surface of the remainder of the major element, forming a segment element, placing the segment element in the countersink on the glass major element and subjecting the assembly to a fusing temperature to provide a fused, multifocal, ophthalmic lens blank.

2. A method in accordance with claim 1 wherein the glass major element is formed from a white crown glass.

3. A method in accordance with claim 1 wherein the glass major element is formed a photochromic glass.

4. A method in accordance with claim 1 wherein the thickness of the raised countersink zone of the glass major element approximates prior major element thickness.

5. A method in accordance with claim 1 wherein, in removing the raised portion of the glass major element to form a countersink, a raised shoulder is retained around the periphery of the countersink to accommodate confinement of the segment element and strengthen the edge of the countersink.

6. A method in accordance with claim 5 wherein the thickness of the raised peripheral shoulder of the countersink zone is at least one-fifth to, at most, one-third that of the remainder of the glass major element.

7. A method in accordance with claim 1 wherein the segment element is sealed to a crown glass carrier member.

8. A method in accordance with claim 7 wherein the carrier is formed from the same glass as is the glass major element.

9. A method in accordance with claim 1 wherein the segment element is formed from a barium flint glass.

10. A method in accordance with claim 1 wherein the fused, multifocal, ophthalmic lens blank is ground and polished on its upper surface to a predetermined surface curvature and reading segment size to produce a finished lens.

* * * * *